(12) United States Patent
Zhang et al.

(10) Patent No.: US 7,200,281 B2
(45) Date of Patent: *Apr. 3, 2007

(54) SYSTEM AND METHOD FOR IMAGE-BASED SURFACE DETAIL TRANSFER

(75) Inventors: Zhengyou Zhang, Redmond, WA (US); Zicheng Liu, Bellevue, WA (US); Ying Shan, Plainsboro, NJ (US)

(73) Assignee: Microsoft Corp., Redmond, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 11/108,545

(22) Filed: Apr. 18, 2005

(65) Prior Publication Data

US 2005/0180657 A1    Aug. 18, 2005

Related U.S. Application Data

(63) Continuation of application No. 10/126,118, filed on Apr. 18, 2002, now Pat. No. 7,020,347.

(51) Int. Cl.
*G06K 9/36* (2006.01)
*G09G 5/00* (2006.01)

(52) U.S. Cl. ..................... 382/276; 345/589

(58) Field of Classification Search ............... 382/108, 382/118, 162, 264, 274–276, 287, 294, 284, 382/296; 345/473, 582, 426, 581, 584, 589, 345/611, 648, 428, 651
See application file for complete search history.

(56) References Cited

U.S. PATENT DOCUMENTS

| | | | | |
|---|---|---|---|---|
| 4,276,570 A | * | 6/1981 | Burson et al. | 382/276 |
| 6,016,148 A | * | 1/2000 | Kang et al. | 345/622 |
| 6,088,040 A | * | 7/2000 | Oda et al. | 345/473 |
| 6,278,466 B1 | * | 8/2001 | Chen | 345/473 |
| 6,283,858 B1 | * | 9/2001 | Hayes et al. | 463/31 |
| 6,351,265 B1 | * | 2/2002 | Bulman | 345/660 |

* cited by examiner

*Primary Examiner*—Kanjibhai Patel
(74) *Attorney, Agent, or Firm*—Lyon & Harr, LLP; Katrina A. Lyon

(57) ABSTRACT

A system and method, called Image-Based Surface Detail Transfer, to transfer geometric details from one surface of an object in an image to another with simple 2D image operations. The basic observation is that, without knowing its 3D geometry, geometric details (local deformations) can be extracted from a single image of an object in a way independent of its surface reflectance, and furthermore, these geometric details can be transferred to modify the appearance of other objects directly in images. Examples are shown including surface detail transfer between real objects, as well as between real and synthesized objects.

19 Claims, 6 Drawing Sheets
(3 of 6 Drawing Sheet(s) Filed in Color)

SYSTEM AND METHOD FOR IMAGE-BASED SURFACE DETAIL TRANSFER

CROSS-REFERENCE TO RELATED APPLICATIONS

This application is a continuation of a prior application entitled "A SYSTEM AND METHOD FOR IMAGE-BASED SURFACE DETAIL TRANSFER" which was assigned Ser. No. 10/126,118 and now U.S. Pat. No. 7,020,347 B2 and filed Apr. 18, 2002.

BACKGROUND

1. Technical Field

This invention is directed toward a system and process, called Image-Based Surface Detail Transfer (IBSDT), for transferring geometric details from one surface in an image to another surface in another image with simple 2D image operations.

2. Background Art

Changing the appearance of an object by adding geometric details is desirable in many real world applications. For example, one may want to know what a wall might look like after adding some geometrical bumps on the wall, or one may want to know what a person might look like after adding/reducing wrinkles on his/her face, and so on. Adding geometric details to an object typically requires modeling both the object and the surface details. It is usually not trivial to build a 3D model for a real object. It is also typically tedious and labor intensive to model and create surface details with existing geometric modeling tools. Bump mapping [3] has been used as an alternative to adding geometrical details to an otherwise smooth object. But constructing visually interesting bump maps requires practice and artistic skills.

Computer vision techniques have been very helpful for modeling real world objects as well as the surface details. These techniques include laser scanner, steror algorithms, shape from lighting variation [8, 17], and shape from shading [10,9], among others. There are, however, many difficulties in the techniques used to model these real world images. Some of these techniques require specialized equipment. Many other techniques require at least two images for each object to be modeled, and it may be difficult to capture the high resolution geometrical details required for photo-realistic modeling robustly. Although shape from shading technique only requires a single image, this method usually requires detailed knowledge of the lighting condition and reflectance functions.

One use for changing the appearance of an object by adding geometric details is in the context of aging simulation. Aging simulation of human faces has applications in computer games, entertainment, cosmetics and virtual reality. Skin aging is a complex process that depends on multiple factors such as age, race, gender, health and even lifestyle. Anatomically, skin is attached to the underlying muscle by connective tissues and the attached end of a muscle is fixed to the skull. Facial appearance changes as the consequence of the gradual aging change of all of the facial components and the comprehensive interactions among these components. In spite of the difficulty of the problem, various techniques have been developed to analyze and synthesize facial aging effects. These methods can be roughly classified into three categories: model-based, image-based, and learning-based.

The model-based approach for facial aging effects is closely related to previous work on skin deformation simulation and skin texture synthesis. Wu et al. [18] proposed a three-layered Elastic Membrane Model for facial wrinkle simulation where "the deformation of skin is activated by the simulated muscle layer, constrained by the connective tissue layer and decided by a biomechanical model". The skin model is computed with the aid of the feature points selected on the reconstructed face model. The wrinkles generated from the skin model are composed with real face images to produce the image of an aged face. An improved model was reported by Boissieux et al. [2], where the thickness and the mechanical properties of each skin layer are considered. This approach provides good insight into the nature of the aging process and can be used as guidelines in cosmetic and medical applications. In general, this approach requires 3D geometry information to perform physical simulation. The results are usually not as photorealistic as the image based approaches.

Boissieux et al. [2] developed an image-based method that uses eight generic masks generated from real photos of the aged people. Each mask contains quantitative information about the amount, shape and intensity of wrinkles with respect to gender, facial shape, and expression. To customize the face of a particular person, the wrinkle intensity (or depth) is computed and the mask is warped onto that face. The composition of the warped mask image and the image of the specific face forms the texture map of the final 3D model of the face. Because the generic masks contain mainly the wrinkle information, other morphological changes on the face due to aging cannot be reflected. An additional limitation of this method is that it cannot make an old face look younger. An additional-image based method was reported by Burson and Nancy [4]. It computes the differences of the aligned images of a young face and an old face. Given the image of another young face to be aged, the difference image is warped and added to this face to make it look older.

Learning-based approaches try to establish a statistical model for the aging process without understanding the underlying mechanisms. Lanitis et al. [11] suggested a linear face model of 15 parameters, obtained by Principal Component Analysis (PCA) on a set of normalized training examples. By using the same set of training data after sorting it according to age, they are also able to find a so-called aging function that relates the model parameters to the age. Choi [5] uses a PCA method to find the age related components for both skull and skin changes. By carefully choosing and normalizing the training examples, he is able to simulate the aging effect with the first principal components from both skull and skin data. The learning based approach is powerful because it does not rely on detail domain specific knowledge. It does, however, require a careful selection of the training data used.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward a system and process that overcomes the aforementioned limitations in systems for transferring geometric details from one surface to another by using simple 2D operations and without knowing the actual geometric information of the surfaces. In particular, the invention uses a novel technique, called Image-Based Surface Detail Transfer (IBSDT), to capture the geometrical details of an object from a single image in a way that is independent of its reflectance property. The captured geometrical details can then be transferred to the surface of a similar object to produce the appearance of the new surface with added geometrical details while its reflectance property is preserved.

The computer-implemented system and process for transferring geometrical details from an object in a first image to a similarly shaped object in a second image operates as follows. A first image depicting an object whose surface details are to be transferred and a second image depicting an object of similar shape as depicted in the first image are input into the system. The two images ideally should be taken under the same, or at least similar, lighting conditions. For images taken under completely different lighting conditions, one of several known relighting techniques may be used to compensate for the lighting difference between the images. For instance, the color ratio between the images taken under different lighting conditions can be used to modify at least one of the images such that the lighting between the images is the same. Similarly, the color difference (instead of ratio) between image pairs can be used to modify one of the original images so that it matches the lighting conditions of the other.

The two objects in the two images are then aligned. If the objects are of a simple geometrical shape, such as a sphere, square or rectangle, alignment is typically performed by simple rotation, translation and scaling. If the objects are more complex, such as that of a human face, the objects in the images are usually aligned via image warping. This involves putting markers on the feature points of the objects in the images. The feature points of the objects are then aligned by warping the coordinates of the feature points in the first image to the coordinates of the feature points in the second image, thereby allowing the corresponding pixel locations in the first and second images as well as their respective intensities to be identified. One of many known image warping techniques may be used. In one embodiment the images are warped by using Delaunay triangulation, a popular image warping technique.

Once the images are warped, smoothed versions of the input images after warping are computed. This smoothing is preferably performed by applying a Gaussian filter, but other known image smoothing techniques can also be used.

The ratio of the original intensity to the smoothed intensity is then computed for each pixel in the first input image after warping.

A new image, having the geometric details of the first input image, but the material properties of the second, is then created by multiplying the ratio of the original intensity to the smoothed intensity of the first warped image by the smoothed intensity in the second image for each corresponding pixel (correspondence as determined by the warping operation).

One embodiment of the invention simulates the aging or making younger the facial characteristics of a person. Two images are input, a first image depicting a face whose facial characteristics are to be transferred and a second image depicting a face that is to receive the facial characteristics of the face in the first image. If the two images were taken under different lighting conditions, this can be compensated for by one of the various conventional relighting techniques. The faces in the first and second images are then aligned. A smoothed version of the faces in the first and second images are then computed. This smoothing is conducted either by applying a Gaussian filter or in some other way of downsizing or averaging the pixel intensity of the images. For each pixel in the face of the first warped image, the ratio of the original pixel intensity to the smoothed intensity is computed. A new facial image is then created by multiplying the ratio of the original intensity to the smoothed intensity of the face in the first warped image by the smoothed intensity for each corresponding pixel in the second image. Thus, a person can be aged if the facial characteristics of the face to be transferred depict an older face than the facial characteristics of the face in the second image. Likewise, if the facial characteristics of the face to be transferred depicts a younger face, a person can be depicted as younger.

One issue with respect to the IBSDT technique is that it assumes that the surface reflectances are smooth. For objects with abrupt reflectance changes such as small color spots, the IBSDT may confuse these color spots with geometrical details. For example, the IBSDT technique is only intended to apply to skin, not eyebrows, eyeballs, or lips. Therefore, in one embodiment of the invention dealing with facial changes, these regions are masked out so that they are not changed. Similar masking can be used in other embodiments. As an alternative to masking, it may be possible to separate these color variations from geometry variations perhaps through learning or some other approach.

The IBSDT technique is particularly useful for adding geometric details to a real world object for which only a single image is available as it requires only a single image for each object from which surface details are to be transferred. It also provides a simple way to capture geometrical details of a real world object and apply it to other synthetic or real world objects. Other advantages of this method are that it is simple to implement and reliable. In a facial aging context, this invention allows a user to easily generate various aging effects as long as they can obtain different people's facial images. The desired facial effects can be transferred from facial images of people of different sexes, races and ages. Additionally, the aging simulation is bi-directional, meaning that it can also make an old person look younger.

DESCRIPTION OF THE DRAWINGS

The file of this patent or application contains at least one drawing executed in color. Copies of this patent or patent application publication with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
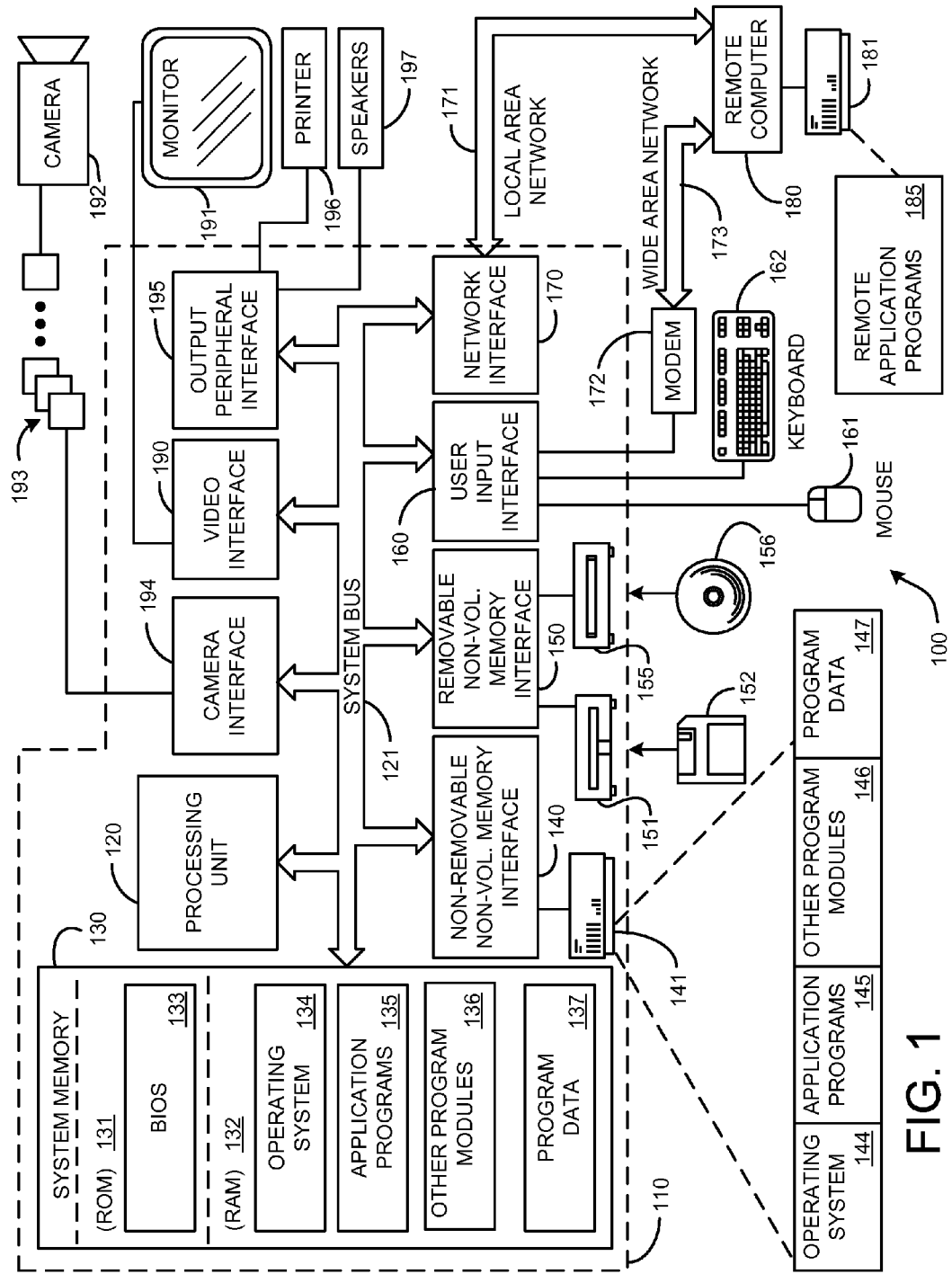
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Image-Based Surface Detail Transfer System and Method.

In this section, the system and method of Image-Based Surface Detail Transfer (IBSDT) is described.

2.1 Overview

The surface detail transfer method according to the present invention is image-based. The idea of changing object appearance with only image information has been explored by various other researchers in both computer vision and graphics communities as discussed in the Background section.

As discussed in the Background, Burson and Nancy [4] computed the difference of the aligned images of a young face and an old face. Given the image of a new person's face to be aged, the difference image is warped and added to this new face to make it look older. One problem with this technique is that the difference image contains the skin color information of the original two faces so that the skin color of the new face may be modified by the aging process (dark skin becomes light skin, etc).

Another method of transferring geometric details from one object to another was derived by Liu et al. Liu et al. [13] used the image ratio between a neutral face and an expression face of the same person (called expression ratio image) to modify a different person's neutral face image and generate facial expression details.

The IBSDT technique of the invention is related to the works of Liu et al. [13] and Burson and Nancy [4] in that all deal with surface deformations. However, the IBSDT method differentiates from these two works and all the related works mentioned above in the Background section in that the IBSDT technique only requires one source image. The key observation that is the basis of the IBSDT technique is that the smoothing in the image domain corresponds to the smoothing in the geometrical domain when the surface reflectance is smooth. This point will be detailed mathematically below.

2.2 Image-Based Surface Detail Transfer Theory

Surface normal is one of the most important geometric factors that determine the visual appearance of a surface. Techniques such as bump maps have been used to generate the illusions of modified geometry without explicitly changing the shape of the surface. The IBSDT method operates by producing the appearance of modifying a surface's normal by transferring geometric details from another surface without explicit 3D information. For example, given images of two spheres with different material properties where one sphere is smooth and the other is bumpy, the method can modify the image of the smooth sphere so that it looks as bumpy as the second sphere while its material properties (e.g., color) are kept the same. This can be done without using explicit 3D information as long as the objects are similarly shaped.

The bumps on the surfaces are regarded as the geometrical details because they represent the high frequency geometrical information. Since the method transfers bumps from one surface to another directly from their images without 3D information it is called Image-based Surface Detail Transfer.

2.2.1 Notation and Problem Statement

For any point P on a surface S, let n(P) denote its normal. Assume there are m point light sources. Let $l_i(P)$, $1 \leq i \leq m$, denote the light direction from P to the i-th light source, and $I_i$ its intensity. Suppose the surface is diffused, and let $\rho(P)$ be its reflectance coefficient at P. Under Lambertian model, the recorded intensity of point P in the image I is $$I(p) = \rho(P) \sum_{i=1}^{m} I_i n(P) \cdot l_i(P) \qquad (1)$$

where p=C(P) is the 2D projection of P onto the image, and C (•) is the camera projection function. Two surfaces $S_1$ and $S_2$ are said to be aligned if there exists a one-to-one mapping F such that for all $P_1 \in S_1$ and $P_2 = F(P_1) \in S_2$ $$\|P_1 - P_2\| \leq \epsilon \qquad (2)$$

where $\epsilon$ is a small positive, and furthermore, there exist neighborhoods $\Theta(P_1)$ of $P_1$ and $\Theta(P_2)$ of $P_2$ such that $$\|\bar{n}P_1 - \bar{n}P_2\| \leq \delta \qquad (3)$$

where $\delta$ is a small positive, and $\bar{n}(P_1)$ and $\bar{n}(P_2)$ are the mean normal defined in the neighborhoods of $\Theta(P1)$ of P1 and $\Theta(P_2)$ of $P_2$, respectively. The problem can then be stated as the following. Given images $I_1$, and $I_2$ of two aligned surfaces $S_1$ and $S_2$, respectively, what is the new image $I_2'$ of $S_2$ if its surface normal is modified such that $$n_2'(P_2) = n_1(P_1) \qquad (4)$$

where $P_1$ and $P_2$ are the corresponding points defined by the mapping F.

2.2.2 A Geometric Viewpoint

The following discussion assumes a single point light source to simplify the derivation. Extension to multiple light sources is straight forward. Because the distance between $P_1$ and $P_2$ is small according to Eq. (2), it is reasonable to assume that the light is always sitting far away enough such that $\epsilon \ll d_l$, where $d_l$ is the average distance from light to the points. This leads to the approximation $l(P_1) \approx l(P_2)$. From Eq. (1) and (4), it can be shown that $$\frac{I_2'(p_2)}{I_2(p_2)} = \frac{\rho(P_2) l n_2'(P_2) \cdot l(P_2)}{\rho(P_2) l n_2(P_2) \cdot l(P_2)} \qquad (5)$$

$$\frac{I_2'(p_2)}{I_2(p_2)} \approx \frac{\rho(P_1) l n_1(P_1) \cdot l(P_1)}{\rho(P_2) l n_2(P_2) \cdot l(P_2)} \frac{\rho(P_2)}{\rho(P_1)}$$

$$\equiv \frac{I_1(p_1)\rho(P_2)}{I_2(p_2)\rho(P_1)}$$

where $\rho$ has the same meaning as in the Eq. (1), $p_1 = C_1(P_1)$, $p_2 = C_2(P_2)$, and $I_1$, $I_2$, and $I_2'$ have the same meaning as in the problem statement. Notice that the C (•) functions are different for the two surfaces. This is because the images $I_1$ and $I_2$ of the surfaces could be taken by two different cameras. This leads to $$I_2'(p_2) \approx \frac{I_1(p_1)\rho(P_2)}{\rho(P_1)} \qquad (6)$$

In order to compute the ratio of $\rho(P_1)$ and $\rho(P_2)$, the smoothed image of I is defined as $$\bar{I}(p) \equiv \sum_{q \in \Omega(p)} w(q) I(q) \qquad (7)$$

where $\Omega\Omega(p) = C(\Theta(P))$ is the neighborhood of p, and w is the kernel function of a smooth filter, say, a Gaussian filter or an average filter. Assuming that the size of $\Theta(P)$ is relatively small as compared with its distance to the light source, $I(P) \approx I(Q)$, $\forall Q \in \Theta(P)$. Also assuming that $\rho(P) \approx \rho(Q)$ $\forall Q \in \Theta(P)$, from Eq. (7) and Eq. (1), it is then obvious that $$\bar{I}(p) \equiv \rho(P) l \left( \sum_{Q \in \Theta} w(C(Q)) n(Q) \right) \cdot l(P) \qquad (8)$$

where $\sum_{Q \in \Theta} w(C(Q)) n(Q) = \bar{n}(P)$, and $\bar{n}(P)$ is the mean normal as mentioned in the problem statement. For surface $S_1$ and $S_2$, then $$\frac{\bar{I}_2(p_2)}{\bar{I}_1(p_1)} \equiv \frac{\rho(P_2) l \bar{n}(P_2) \cdot l(P_2)}{\rho(P_1) l \bar{n}(P_1) \cdot l(P_1)} \qquad (9)$$

Since the two surfaces are aligned, $l(P_1) \approx l(P_2)$, and $\bar{n}(P_2) \approx \bar{n}(P_1)$. Equation (9) can then be rewritten as $$\frac{\rho(P_2)}{\rho(P_1)} \approx \frac{\bar{I}_2(p)}{\bar{I}_1(p)} \qquad (10)$$

Substituting Eq. (10) into Eq. (6) leads to $$I_2'(p_2) \approx \frac{I_1(p_1)}{\bar{I}_1(p_1)} \bar{I}_2(p_2) \qquad (11)$$

Eq. (11) shows that the transfer of surface normal can be approximated by some simple operations on the images of the surfaces.

2.2.3 An Intuitive Signal Processing Viewpoint
Eq. (11) is rewritten as $$I'_2(p_2) \approx \frac{I_1(p_1)}{\bar{I}_1(p_1)}\bar{I}_2(p_2) \equiv \left(1 + \frac{I_1(p_1) - \bar{I}_1(p_1)}{\bar{I}_1(p_1)}\right)\bar{I}_2(p_2) \quad (12)$$

From a signal processing view point, Eq. (12) simply substitutes the high frequency components of $I_2$ with those from $I_1$. The high frequency components $I_1 - \bar{I}_1$ in $I_1$ are normalized by $\bar{I}_1$ in order to cancel the intensity scale difference between the low frequency components of $I_2$ in $I_1$. Generally, $I_1$ could be any image, regardless of the conditions given in the previous section. But the resultant image could be meaningless because of the inconsistency between the transferred detailed components from $I_1$ and native low frequency components on the $I_2$. This happens when $I_1$ and $I_2$ are the images of two surfaces that are not aligned.

3.0 Implementation of IBSDT

Figure 2A:
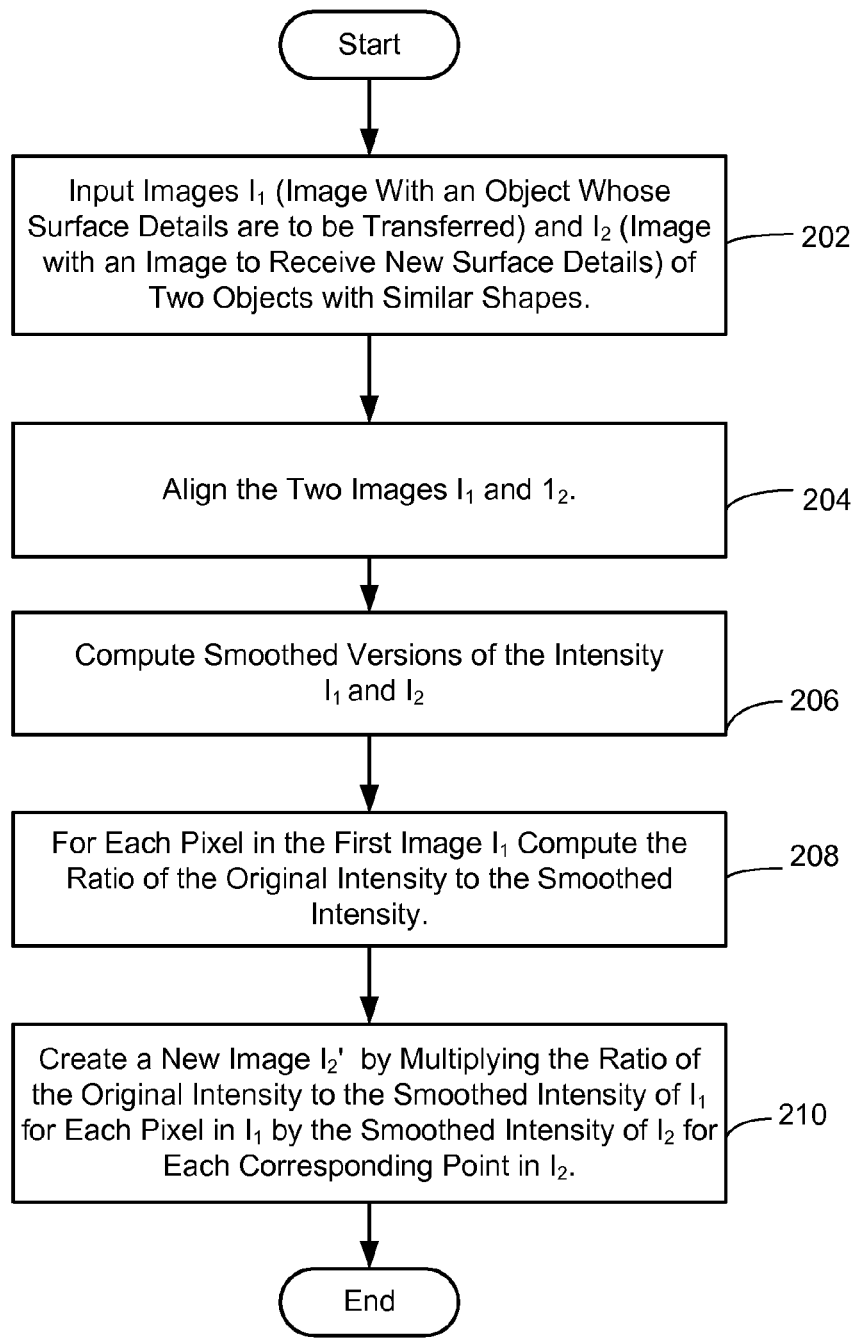
FIG. 2A is a flow diagram depicting the general process of the system and method according to the present invention.
Figure 2B:
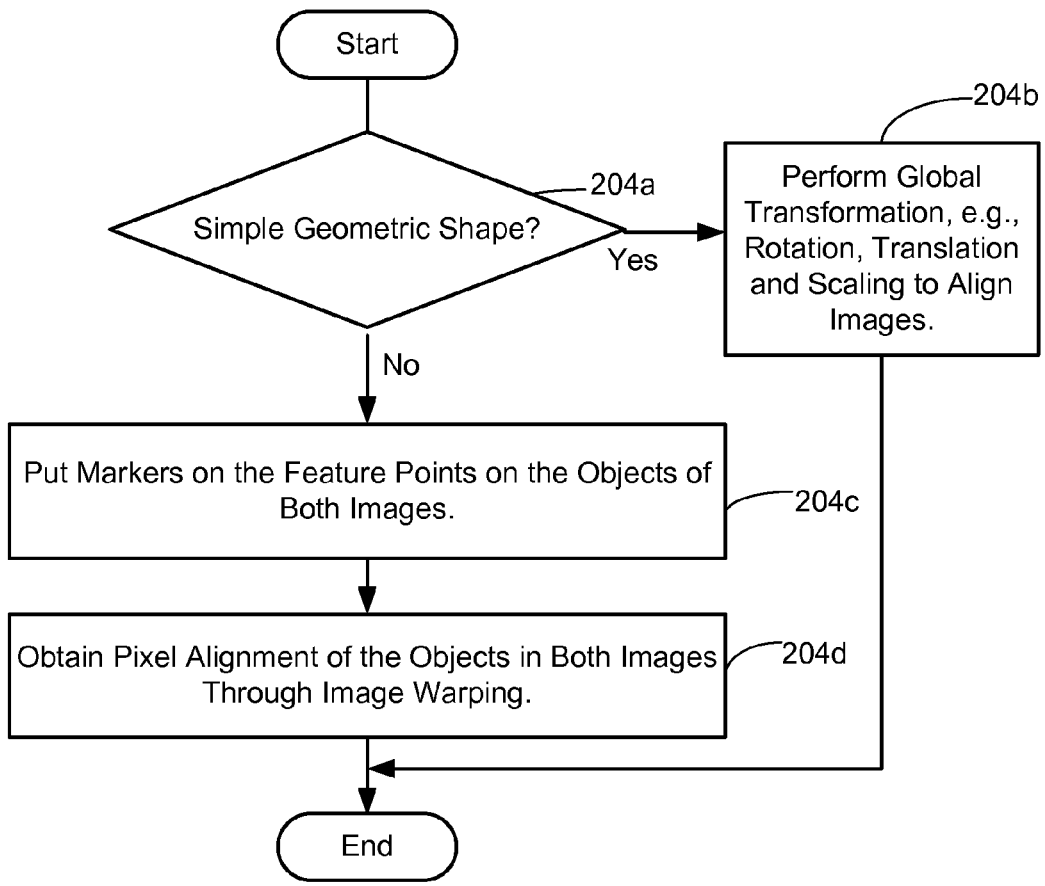
FIG. 2B is a flow diagram detailing the image alignment process action of FIG. 2A.

In general, as shown in FIGS. 2A and 2B, given images $I_1$ and $I_2$ of similar shapes (process action 202), to perform surface detail transfer, the two images first need to be aligned, as shown in process action 204. For simple geometrical shapes such as rectangles and spheres, usually it is only necessary to perform global transformations including rotation, translation, and scaling (process actions 204a and 204b). For more complicated shapes such as human faces, markers are first manually placed on the boundaries and the feature points, and then pixel alignment is obtained through image warping [1, 12] (process actions 204c and 204d). In one implementation of the invention, a simple triangulation-based image warping method is used. Once the alignment is done, a Gaussian filter is run with a user specified σ on $I_1$ and $I_2$ to obtain smoothed image intensities $\bar{I}_1$ and $\bar{I}_2$ of the warped image 1 and image 2 (process action 206). For each pixel in the first warped images, the ratio of the original intensity to the smoothed intensity is calculated (process action 210). Finally Equation (11) is used to obtain $I_2'$ by multiplying the obtained ratio of the original intensity to the smoothed intensity for every corresponding pixel in $I_2$ (process action 210).

Intuitively, the standard deviation sigma (σ) of the Gaussian filter controls how much geometrical smoothing is performed on the surface of $I_1$. It determines the scale of the surface details to be transferred. A small σ allows fine geometrical details to be transferred while σ large a allows only large scale geometrical deformations to be transferred.

3.1 Implementation with Respect to a Facial Aging Method

One facial aging embodiment of the IBSDT system and method will now be described.

Geometrically, the difference between an old person's skin surface and a young person's skin surface is that the old person's skin surface has more bumps than the young face. If the bumps of an old person's skin surface are transferred to a young person's face, the young person's face will become bumpy and look older. Conversely, it is also possible to replace the bumps of an old person's skin surface with that of the young person's face so that the old person's face gets smoother and looks younger. The surface details transfer system and method as described above can be applied to human faces to simulate aging effects.

Since human faces are generally alike, e.g., they all have eyes, noses and mouths and their shapes are similar, it is relatively easy to align the shapes of two faces by simple warping between the images of the face. The aging simulation based on IBSDT is outlined below.

1. Input. Images of two faces with different ages, taken under the same or similar lighting conditions are input. Suppose that $I_2$ is the image of the face to be aged, and $I_1$ is the one from which the surface details will be transferred.
2. Image Warping. The feature point set for both images are marked manually, and $I_1$ is warped to $I_2$ according to the image correspondences. The warped image is denoted as $\tilde{I}_1$.
3. Image Smoothing. Compute smoothed versions, i.e. $\tilde{\bar{I}}_1$ and $\bar{I}_2$ of $\tilde{I}_1$ and $I_2$ with Gaussian filter of a specified σ.
4. Transferring of Surface Details. Transfer surface details for $\tilde{I}_1$ to $I_2$ using Eq. (11), using the warped version of the original first image ($\tilde{I}_1$) to the smoothed warped version of $\tilde{\bar{I}}_1$ in calculating the ratio that is multiplied by the smoothed $\bar{I}_2$.
5. Output. Output an aged face image $I_2'$.

The best way to prepare input images is to take the two face images under the same lighting conditions. This will ensure the validity of Eq. (11), and maximize the realism of the aged face image. When the lighting conditions are not radically different, Eq. (11) is still valid to transfer the details of the intensity changes from $I_2$ to $\tilde{I}_1$ The resultant image contains surface detail information from one lighting condition and the global surface information from the other. In practice, the human eye is much less sensitive to this sort of local-global inconsistency than might be expected. Consequently, the aging results usually look reasonable even when the lighting conditions are quite different.

For images taken under completely different lighting conditions, a relighting technique may be used to compensate for the lighting difference between the images. For instance, Marschner et al. [14,15] used the color ratio between the rendered image pairs under the old and new lighting conditions to modify photographs taken under the old lighting conditions to generate photographs under the new lighting condition. Similarly, Debevec [6,7] used the color difference (instead of ratio) between image pairs to modify the original photograph. Riklin-Raviv and Shashua [16] used color ratio (called quotient image) to adjust images taken under different lighting conditions.

Another issue with respect to the IBSDT technique is that it assumes that the surface reflectances are smooth. For objects with abrupt reflectance changes such as small color spots, the IBSDT may confuse these color spots with geometrical details. For example, geometrical details such as wrinkles and muscle tone changes are the only changes sought to be transferred. However, details such as beauty spots or frontal hairs extending into the forehead in the face images will also be transferred. The reason is that abrupt changes in the reflectance of these areas violate the assumption of Eq. 8 that reflectances in a region should be similar. As a result, the intensity changes are regarded as the normal consequence of normal changes and are transferred as well by the IBSDT. Another limitation is that the IBSDT technique only applies to skin, not eyebrows, eyeballs, or lips. In an embodiment of the invention dealing with facial changes, these regions are masked out so that they are not changed. Alternately, it may be possible to separate these color variations from geometry variations perhaps through learning or some other approaches.

Image warping is a simple matter of transforming one spatial configuration of an image into another. To warp the images, points are manually marked on the face features, by allowing a person to mark the points on the displayed image with an input device. These face features typically include points around the circumference of the face, and points around the eyes, mouth and nose. Texture mapping software and hardware is used to warp an image from one set of markers to another. In one embodiment of invention, Delaunay triangulation is simply applied to the mark points. Delaunay triangulation is well known in image warping. It connects an irregular point set (in this case determined by the markers on the face features) by a mesh of triangle's each satisfying the Delaunay property. This means that no triangle has any points inside its circumcircle, which is the unique circle that contains all three points (vertices) of the triangle The warp is realized by applying the triangular mesh of the first point set in the first image to the second point set in the second image. Each point on each triangle can be uniquely mapped to the corresponding triangle of the second point set by an affine transformation, which basically consist of scaling, translation and skewing. This method is fast but the resulting image quality is not as good as with other more advanced image warping techniques. Other more advanced image warping techniques known in the art can also be used to warp the images.

The standard deviation sigma ($\sigma$) of the Gaussian filter is the only control parameter and plays an important role in the whole procedure. In a Gaussian filter, the value of the pixel under investigation is replaced by the Gaussian-weighted average of the pixel values in the filter region which lie in the interval plus or minus $\sigma$ from the value of the pixel that is filtered. As a result, the $\sigma$ determines the scale of the surface details to be transferred from $\tilde{I}_1$ to $I_2$. If $\sigma$ is set to be small, only fine details on the face such as wrinkles will be transferred. On the contrary, larger scale details such as those caused by the muscle shrink can also be transferred which can also be used.

4.0 Results

Figure 3:
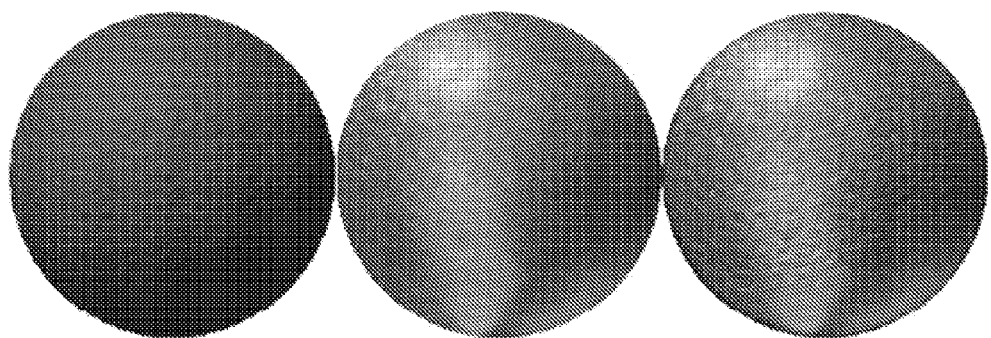
FIG. 3 is a series of images illustrating the results of transferring the geometrical details of a synthetic sphere to a nectarine.

FIG. 3 shows the results of transferring the geometrical details of a synthetic sphere to a nectarine. The bumps on the synthetic sphere are generated by using bump mapping technique. The surface reflectance property on the synthesized sphere is set to be uniform. A point light source is placed on top of the sphere so that its lighting condition is somewhat close to the lighting condition of the nectarine. It can be seen that that the bumps on the synthetic sphere are transferred nicely to the nectarine except at the bottom where the synthetic sphere is basically dark. The sizes of the image are 614 by 614 pixels, and $\sigma$ is 8.

Figure 4:
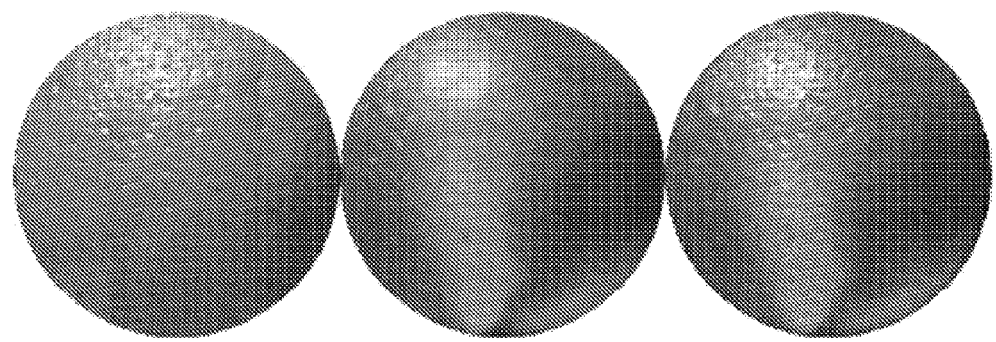
FIG. 4 is a series of images illustrating the results of transferring the geometrical details of a real orange to a nectarine.

FIG. 4 shows the results of transferring the geometrical details of a real orange to the same nectarine as in FIG. 3. The bumps on the oranges are transferred faithfully to the nectarine. The image dimensions and $\sigma$ are the same as in FIG. 3. This example also reveals a limitation of the IBSDT procedure: the highlights on the orange are transferred to the nectarine. The reason is that the highlights are treated as being caused by geometrical variations.

Figure 5:
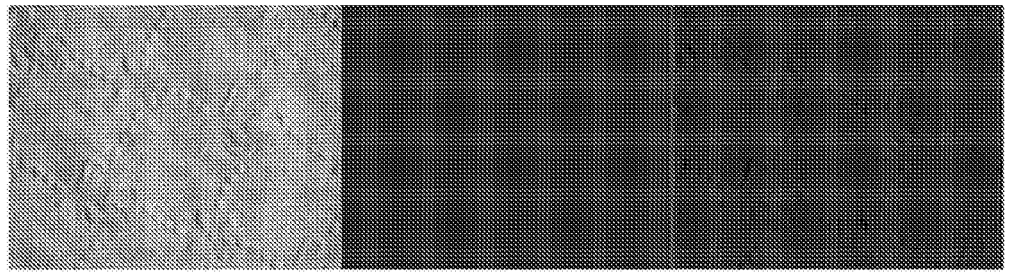
FIG. 5 is a series of images illustrating the results of transferring the geometrical details of a tissue to a synthetic rectangle.

FIG. 5 shows the results of transferring the geometrical details of a tissue to a synthetic rectangle. It can be seen that only the geometrical bumps on the tissues are transferred to the rectangle while the material color of the rectangle is preserved.

Figure 6:
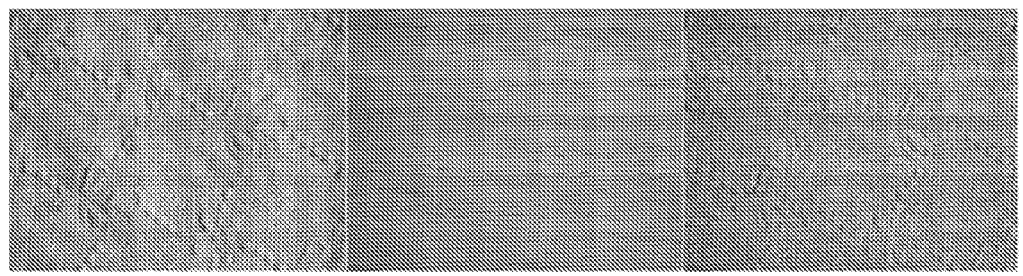
FIG. 6 is a series of images showing the results of geometric detail transferring from a tissue to the image of a piece of wood.

FIG. 6 shows the results of geometric detail transferring from the same tissue to the image of a piece of wood. Both pictures are taken under the same lighting conditions. It can be seen that the small bumps on the tissues are transferred to the wood while the wood texture is preserved.

Figure 7:
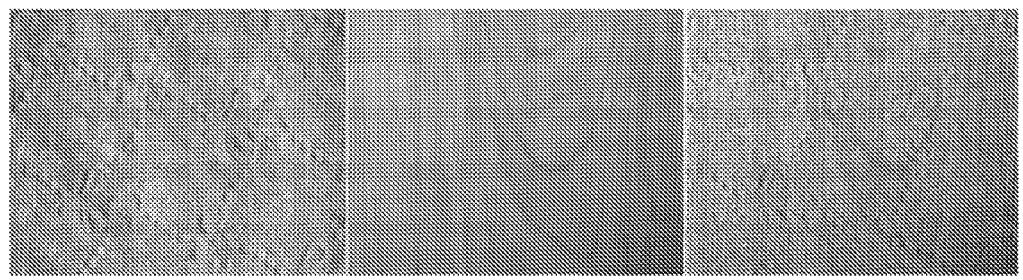
FIG. 7 is a series of images showing the result of transferring the geometrical details of the same tissue to a table surface.

FIG. 7 shows the result of transferring the geometrical details of the same tissue to a table surface. This table surface has a different texture pattern than the wood in FIG. 6. It is interesting to compare the results (the images on the right) in FIG. 6 with FIG. 7, and notice that they have the same geometrical bumps but different material properties.

One interesting application of IBSDT is aging effect synthesis. Geometrically, the difference between an old person's skin surface and a young person's skin surface is that the old person's skin surface has more bumps than the young face. If the bumps of an old person's skin surface are transferred to a young person's face, the young person's face will become bumpy and look older. Conversely, the bumps of an old person's skin surface can also be replaced with that of the young person's face so that the old person's face gets smoother and look younger. The IBSDT technique as described above is shown as it is applied to human faces to generate aging effects. The alignment is done by first marking face boundaries and face features such as eyes, noses, and mouths, and then use triangulation-based image warping to warp $I_1$ toward $I_2$. In one embodiment IBSDT is only applied to pixels inside of the face boundary. In addition, the pixels in the regions of the two brows, the two eyeballs, nose top, and the mouth are not modified by IBSDT either.

Figures 8A, 8B, 8C:
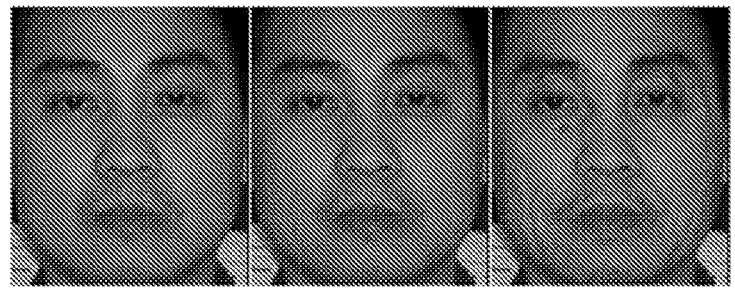
FIGS. 8A–8F is a series of images showing the aging effect synthesis results between the faces of a young male (a) and an old male (d).
Figures 8D, 8E, 8F:
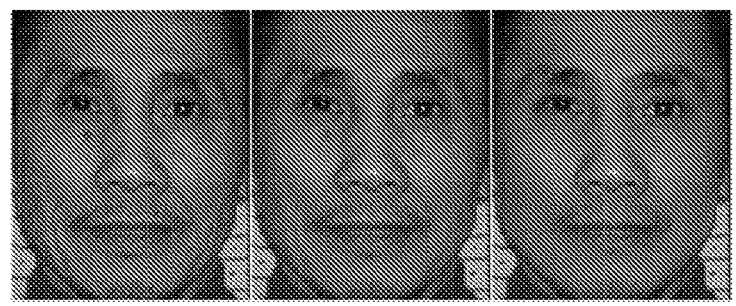
Figures 9A, 9B:
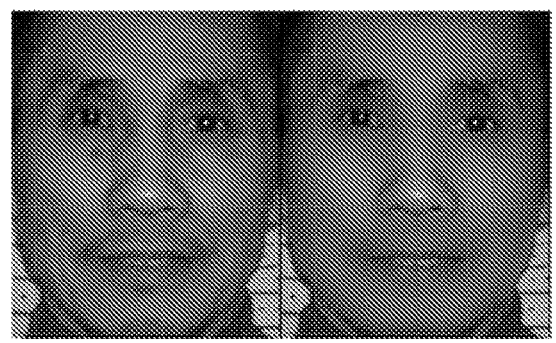
FIGS. 9A and 9B is a set of images showing the aging process without applying the IBSDT technique. The input image is the same as the one shown in FIG. 8D.

FIGS. 8A–8F show the aging effect synthesis results between the faces of a young male FIG. 8A and an old male FIG. 8D. For each face, a different $\sigma$ of the Gaussian filter is used during the surface detail transfer. Images in the middle (FIG. 8B and FIG. 8E) are the results with $\sigma=3$, and those on the right (FIG. 8C and FIG. 8F) with $\sigma=8$. It can be seen that varying $\sigma$ produces reasonable in-between aging effects such as FIG. 8B and FIG. 8E. Obviously, surface detail transfer plays an important role when making a young person older. However, it is less apparent why this technique is necessary to make an old person younger. To clarify this point, FIG. 8D is simply smoothed without transferring surface details from FIG. 8A, while masking out the facial features as before. FIG. 9A shows the results with $\sigma=3$ and $\sigma=8$ is shown in FIG. 9B. As compared with the images in FIGS. 8E and 8F with the same $\sigma$'s, it can be seen that images in FIGS. 9A and 9B are much less sharp and convincing.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] T. Beier and S. Neely. Feature-based image metamorphosis. In *Computer Graphics,* pages 35–42. Siggraph, July 1992.

[2] Boissieux, G. Kiss, N. m. Thalman and P. Karla. Simulation of Skin Aging and Wrinkles with Cosmetic Insights. In *Computer Animation and Simulation* 2000, 2000.

[3] J. Blinn, Models of light reflection for computer synthesized pictures. In Computer Graphics, pages 192–198, SIG-GRAPH, July 1977.

[4] N. Burson and T. D. Schneider. Method and apparatus for producing an image of a person's face at a different age. U.S. Pat. No. 4,276,570, 1981.

[5] C. Choi, Age Change for Predicting Future Faces. In *IEEE International Fuzzy Systems Conference Proceedings,* pages 1603–1608, 1999.

[6] P. E. Debevec. Rendering synthetic objects into real scenes: Bridging traditional and image-based graphics with global illumination and high dynamic range photography. In *Computer Graphics, Annual Conference Series,* pages 189–198.

[7] P. E. Debevec, T. Hawkins, C. Tchou, H. -P. Duiker, W. Sarokin, and M. Sagar. Acquiring the reflectance field of a human face. In *Computer Graphics, Annual Conference Series,* pages 145–156. Siggraph, July 2000.

[8] R. Epstein, A. Yuille, and P. Belhumeur. Learning object representations from lighting variations. In *ECCV 96 International Workshop,* pages 179–199, 1996.

[9] G. Healey and T. Binford. Local shape from specularity. *Computer Vision Graphics and Image Processing,* pages 62–86, April 1988.

[10] B. Horn and M. J. Brooks. *Shape from Shading.* MIT Press, 1989.

[11] A. Lanitis, C. Taylor, and T. Cootes. Modeling the process of aging in face images. In IEEE Proceedings of the 7th International Conference on Computer Vision, pages 131–136.

[12] P. Litwinowicz and L. Williams. Animating images with drawings. In *Computer Graphics,* pages 235–242. Siggraph, August 1990.

[13] Z. Liu, Y. Shan, and Z. Zhang. Expressive expression mapping with ratio images. In *Computer Graphics, Annual Conference Series,* pages 271–276. Siggraph, August 2001.

[14] S. R. Marschner and D. P. Greenberg. Inverse lighting for photography. In *IST/SID Fifth Color Imaging Conference,* November 1997.

[15] S. R. Marschner, B. Guenter, and S. Raghupathy. Modeling and rendering for realistic facial animation. In *Rendering Techniques,* pages 231–242. Springer Wien New York, 2000.

[16] T. Riklin-Raviv and A. Shashua. The quotient image: Class based rerendering and recongnition with varying illuminations. In *IEEE Conference on Computer Vision and Pattern Recognition,* pages 566–571, June 1999.

[17] H. Rushmeier, G. Taubin, and A. Gueziec. Applying shape from lighting variation to bump map capture. In *Eurographics Workshop on Rendering,* pages 35–44, 1997.

[18] Y. Wu, P. Kalra, and N. M. Thalmann. Physically-based wrinkle simulation & skin rendering. In Erographics Workshop on Computer Animation and Simulation, pages 69–79, 1997.

Wherefore, what is claimed is:

1. A computer-implemented process for transferring geometrical details from a first object in one image to a second object in a second image, comprising:
   an inputting step for inputting a first image depicting an object whose surface details are to be transferred and a second image depicting an object of similar shape as depicted in the first image;
   an aligning step for aligning the objects of similar shape in first and second images;
   a computing step for computing a smoothed version of the first and second images;
   for each pixel in the first aligned image, a ratio computing step for computing the ratio of the original intensity to the smoothed intensity;
   an image creating step for creating a new image by multiplying the ratio of the original intensity to the smoothed intensity of the first image by the smoothed intensity for each corresponding point in the second image.

2. The computer implemented process of claim 1 wherein the aligning step comprises:
   a rotation step for performing a rotation of the images to rotationally align the object in the second image with the object of similar shape in the first image;
   a translation step for performing a translation of the images to align the object in second image with the object of similar shape in the first image; and
   a scaling step for performing a scaling of the images to match the size of the object in the second image with the object of similar shape in first image.

3. The computer-implemented process of claim 1 wherein the aligning step comprises:
   a mapping step for establishing a standard map having nodes at the point of important features;
   a first overlaying step for overlaying said map on the first image, so its nodes match the important features;
   a second overlaying step for overlaying said map on the second image, and causing it to match the important features thereof; and
   a warping step for using coordinates of said map on said second image to warp said second image so as to match the first image, thereby allowing the corresponding pixel locations in the first and second images as well as their respective intensities to be identified.

4. The computer-implemented process of claim 1 wherein the smoothing step comprises a filtering step for performing a Gaussian filtering procedure to each pixel in the first and second images to compute a new value of intensity for each pixel.

5. The computer-implemented process of claim 4 wherein the standard deviation of the Gaussian filter determines the level of the surface details to be transferred from the first image to the newly created image.

6. The computer-implemented process of claim 5, wherein the standard deviation of the Gaussian filter is set to be small and only fine details are transferred.

7. The computer-implemented process of claim 5, wherein the standard deviation of the Gaussian filter is set to be larger and larger scale details are transferred.

8. The computer-implemented process of claim 1 wherein the first and second images do not exhibit similar lighting conditions and wherein a relighting step is applied to compensate in the lighting conditions between the first and second image.

9. A computer-implemented process for simulating the appearance of a face at a different age, comprising:
   an inputting step for inputting a first image depicting a face whose facial characteristics are to be transferred and a second image depicting a face that is to receive the facial characteristics of the face in the first face;
   an aligning step for aligning the faces in first and second images;
   a smoothing step for computing a smoothed version of the faces in the first and second images;
   for each pixel in the face of the first aligned image, a ratio computing step for computing the ratio of the original intensity to the smoothed intensity; and
   an image creating step for creating a new image by multiplying the ratio of the original intensity to the smoothed intensity of the face in the first image by the smoothed intensity for each corresponding point in the second image.

10. The computer-implemented process of claim 9 wherein the aligning step comprises:
    a mapping step for establishing a standard map of markers at the point of important facial features;

a first overlaying step for overlaying said standard map on the face in the first image, so its markers match the important facial features;

a second overlaying step for overlaying said standard map on the face in the second image, and causing it to match the important features thereof; and a warping step for using coordinates of said map on said face in the second image to warp said second image so as to match the first image, thereby allowing the corresponding pixel locations in the first and second images as well as their respective intensities to be identified.

11. The computer-implemented process of claim 9 wherein the facial characteristics of the face in the first image depict an older face than the facial characteristics of the face in the second image, and wherein the newly created image depicts an older face than the face depicted in the second image.

12. The computer-implemented process of claim 9 wherein the facial characteristics of the face in the first image depict a younger face than the facial characteristics of the face in the second image, and wherein the newly created image depicts a younger face than the face depicted in the second image.

13. The computer-implemented process of claim 9 wherein the smoothing step comprises steps for:

for a given area of pixels of predefined size,
averaging the pixel intensity by averaging the intensity of the surrounding pixels.

14. The computer-implemented process of claim 9 wherein comprises a filtering step for applying a Gaussian filter to each pixel in the first and second images.

15. The computer-implemented process of claim 9 wherein certain areas of the first and second images are masked so that they are not changed in the created new image.

16. The computer-implemented process of claim 9 wherein the first image depicting a face whose facial characteristics are to be transferred is a face of different age, race or gender from the face in the second image.

17. A computer-implemented process for transferring the surface details of an object in one image to an object of similar shape in another image, comprising:

a recording step for recording a first image depicting an object whose surface details are to be transferred and a second image depicting an object of similar shape as depicted in the first image;

a smoothing step for smoothing first and second images;

for each pixel in the first image, a computing step for computing the ratio of the original intensity to the smoothed intensity; and an image creating step for creating a new image by multiplying the ratio of the original intensity to the smoothed intensity of the first image by the smoothed intensity for each corresponding point in the second image.

18. The computer-implemented process of claim 17 wherein the object in the first image is a real-world object and the object in the second image is a synthetic object.

19. The computer-implemented process of claim 17 further comprising a warping step for warping the images prior to smoothing them so that the objects of similar shape a located in the same location in the first and second images.

* * * * *